United States Patent [19]

Tomizawa

[11] 4,250,524
[45] Feb. 10, 1981

[54] VALIDATION APPARATUS IN A PAY TELEVISION SYSTEM

[75] Inventor: Akimori Tomizawa, Konosu, Japan

[73] Assignee: Clarion Co., Ltd., Tokyo, Japan

[21] Appl. No.: 14,237

[22] Filed: Feb. 22, 1979

[51] Int. Cl.³ .................... H04N 7/16; H04N 7/10
[52] U.S. Cl. .................... 358/122; 358/84; 358/124
[58] Field of Search ................... 358/122, 124, 84

[56] References Cited

U.S. PATENT DOCUMENTS

| 4,024,574 | 5/1977 | Nieson | 358/124 |
| 4,068,264 | 1/1978 | Pires | 358/124 |
| 4,091,417 | 5/1978 | Nieson | 358/124 |

Primary Examiner—Stephen C. Buczinski
Attorney, Agent, or Firm—Biebel, French & Nauman

[57] ABSTRACT

A validation apparatus in a pay television system, including a code detector means for successively detecting a sequence of code signals, from an encoded composite TV signal, a key code circuit means having a key code so as to validate the sequence of code signals detected in said code detector means for generating a first, a second and a third control signals in response to said sequence of code signals, a polarity flip-flop means being set by the first control signal, thereby assuming a first state and being reset by the second control signal, thereby assuming a second state and being toggled by the third control signal, thereby changing from the first state to the second state or changing from the second state to the first state, a counter means for generating an output signal when the number of state changes in said flip-flop means reaches a predetermined value, a feature detector means for generating an output signal when the detector means receives said third control signal in a predetermined number of times which is peculiar to said sequence of code signals, and a gating means for generating an output signal so as to generate a valid signal representing that said encoded composite TV signal is effectively decoded when both the output signal of said counter means and the output signal of the feature detector means are input thereto at the same time.

2 Claims, 8 Drawing Figures

VALIDATION APPARATUS IN A PAY TELEVISION SYSTEM

BACKGROUND OF THE INVENTION

The present invention relates to a pay television system and, more particularly, to an improvement of an apparatus for validating, in the pay television system, the accurate corresponding relation between a transmitting end and a receiving end.

Attention is directed to U.S. Pat. No. 4,024,574 issued May 17, 1977, which discloses a pay television system, and a validation method and apparatus for the pay television system.

The pay T.V. system, that is, the charged T.V. system of the type of wireless broadcasting has been thought out and developed in compliance with the demand for good and substantial programs even with charge, in view of annoying commercial messages which are unavoidable in programs offered free of charge to the viewers by commercial broadcasting and of decline in the quality of such programs owing to various restrictions. The system has advantages resulting from a wireless system that it can reduce expenses and time for laying a cable for broadcasting, and that number of subscribers to a pay T.V. system. This means that the feature of the pay T.V. system is worthy of attention.

In general, since the pay T.V. system is designed to serve only subscribers therefor, a normal composite T.V. signal is encoded to exclude non-subscribers therefrom. To be specific, a transmitting end includes an encoder for receiving the composite T.V. signal and encoding it according to a predetermined procedure, and such encoder has a key code under which the composite T.V. signal may be encoded. On encoding the signal, a data for decoding the encoded signal, which is formed on the basis of the similar key code, is added to a particular position of the composite T.V. signal. On the other hand, a decoder included in a receiving end receives the encoded composite T.V. signal, reads out the decoding data, and collates the received key code with the key code which has been preset in the decoder or performs a validation detecting operation, whereby it is possible to complete an accurate decoding process and then to output the normal composite T.V. signal, if the key code has been accurately preset in the decoder.

Accordingly, it is necessary in the pay T.V. system to validate the accurate corresponding relation between the key codes of the encoder and the decoder. For this validation, a validation signal which is formed of combination of the particular code signals is output from the transmitting end at the predetermined timing which differs from that of the decoding data, and the decoder then receives the validation signal and performs the validation detecting operation. Consequently, the decoder may generate a valid signal representing that the key code therein is effective on the decoded data signal. The generation of this valid signal means that the decoding operation is completely accomplished on the assumption that a billing data is recorded, when a program selector included in the receiving end is in an appropriate operation mode and a subscriber indicates his intention of watching a T.V. program.

Figure 1:
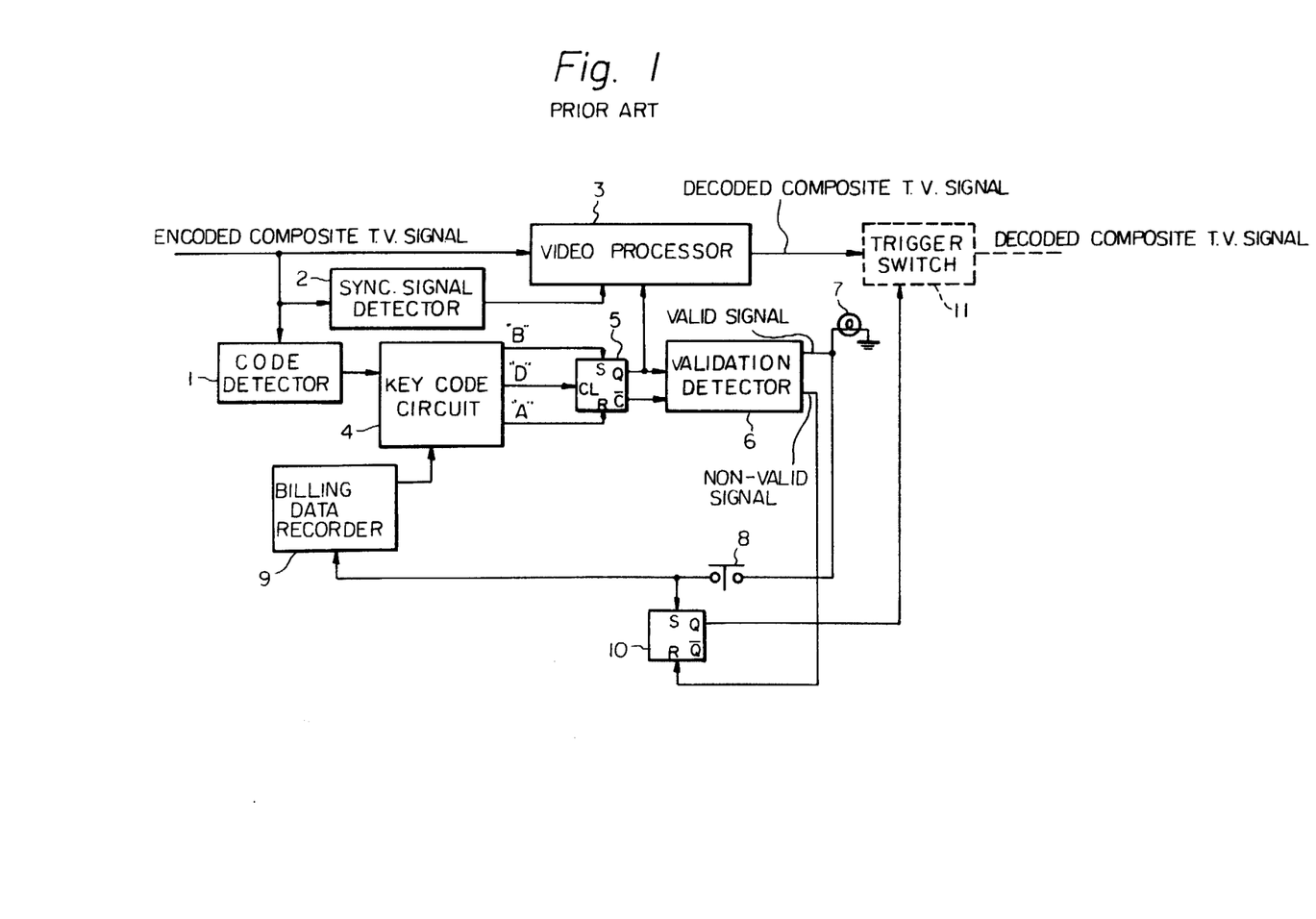
FIG. 1 is a block diagram showing a prior art validation apparatus in the pay T.V. system.
Figure 2:
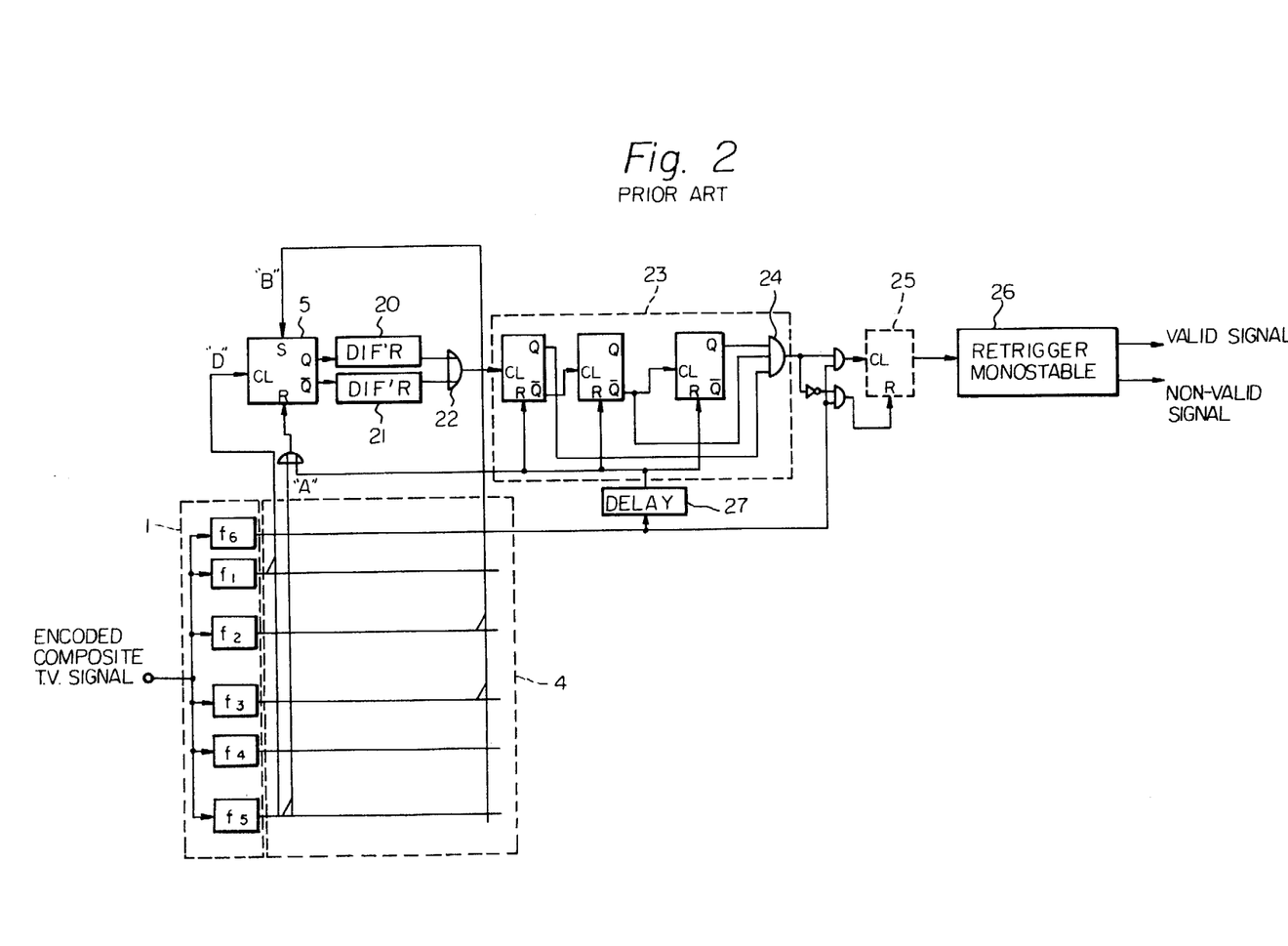
FIG. 2 is a detailed circuit diagram of a portion of the validation apparatus shown in FIG. 1.

FIG. 1 shows a block diagram of a conventional validation apparatus adapted for the transmitting end of the pay T.V. system. FIG. 2 shows a detailed circuit diagram of a portion of the validation apparatus shown in FIG. 1.

An encoded composite T.V. signal is applied to a code detector 1, a sync. signal detector 2 and a video processor 3, respectively. The code detector 1 detects a key code (validation signal) as a decoding data which has been added to the encoded composite T.V. signal in the transmitting end, and, in a key code circuit 4, the detected key code is validated with a key code which has been preset therein, and then the resulting validation is output therefrom as any one of "A", "B", "C" and "D" signals and is used to control a polarity flip-flop 5. Each of the "A", "B" and "D" signals causes the flip-flop 5 to output a signal representing one of two states thereof. The video processor 3 receives both a sync. signal output from the sync. signal detector 2 and a signal output from the flip-flop 5 (Q output), as control signals, decodes the encoded composite T.V. signal as described above, and then outputs a decoded composite T.V. signal. Also, the outputs from the flip-flop 5 are applied to a validation detector 6, and the detector generates a valid signal when the validation signal is received thereby and, alternatively, a non-valid signal when the validation signal is not received thereby. The valid signal enables an indicator such as a lamp 7, is applied to a billing data recorder 9, when the subscriber indicates his intention of watching a T.V. by turning a switch 8 ON, and, at the same time, sets a latch circuit 10. The set condition of the latch circuit turns a trigger switch 11 ON, and makes it possible to transmit the decoded composite T.V. signal to a television receiver (not shown). The billing data recorder functions, in the presence of the valid signal, to record a data representing a period during which the intention of watching is expressed, and to set a key code within the key code circuit 4.

Referring now to FIG. 2, the validation detector 6 comprises differentiators 20 and 21 which detect one state change from $\overline{Q}=1$ to $Q=1$ (from the logic "1" of $\overline{Q}$ output to the logic "1" of $Q$ output) and the other state change from $Q=1$ to $\overline{Q}=1$, respectively, in the polarity flip-flop 5, an OR gate 22 for summing logically the output of each of differentiators 20 and 21, a state change counter 23 for counting the output of the OR gate 22, said counter in FIG. 2 being shown to include an AND gate 24 for generating the logic "1" when the count reaches "5", a validation field counter 25 for counting sequentially a state representing that the count of the counter 23 has reached a predetermined value, and a retrigger monostable multivibrator 26 triggered by the output of the validation field counter 25 for generating a valid signal.

It is assumed that, as disclosed in Nieson U.S. Pat. No. 4,024,574, the encoded composite T.V. signal from the transmitting end is so constructed that a signal or burst "$f_6$" is added to the normal composite T.V. signal to be positioned just before a vertical blanking signal therein and a sequence of code signals or bursts "$f_1f_5f_3f_1f_2$" each of which occupies the time period of a line is added thereto to be positioned after a equalizing pulse following a vertical sync. signal therein is completed, and the sequence of the code signals formed of "$f_1f_5f_3f_1f_2$" is arranged as a validation signal. On the other hand, the key code circuit 4 is so preset that the "D" signal is generated when the code detector 1 detects the code signal "$f_1$", the "B" signal is generated when detects the "$f_2$" and the "$f_3$", the "C" signal is generated when detects the "$f_4$" and the "A" signal is generated when detects the "f₅", respectively (f₁→D, f₂→B, f₃→B, f₄→C, f₅→D), whereby the "A" signal resets the polarity flip-flop 5 ("A" state), the "B" signal sets the flip-flop ("B" state) and the "D" signal toggles the flip-flop (changes from the "A" to the "B" or changes from the "B" to the "A"). Incidentally, the "C" signal is not effective on the operation of the illustrated circuit.

Referring now to FIG. 2, the operation of the circuit will be explained. At first, the code detector 1 detects the "f₆" signal, and the signal then acts to cause the validation field counter 25 to add "one" when the output of the AND gate 24 is the logic "1" and, on the contrary, to cause the counter 25 to be reset when the output is the logic "0". At the same time, the "f₆" signal also brings the polarity flip-flop 5 to an initial state "A" state). Then, the code detector 1 detects, in succession, a sequence of the code signals "f₁f₅f₃f₁f₂" as described above. As shown in the normal key code column of the following table [I], in successive sequence, the "f₁" signal causes the key code circuit 4 to output the "D" signal, thereby changing the polarity flip-flop 5 from the "A" state to the "B" state (Q̄=1→Q=1), the "f₅" signal causes to output the "A" signal, thereby resetting the flip-flop 5 to return it to the "A" state thereof (Q̄=1), the "f₃" signal causes to output the "B" signal, thereby setting the flip-flop 5 to assume the "B" state thereof (Q=1), the "f₁" signal causes to output the "D" signal, thereby changing the flip-flop 5 from the "B" state to the "A" state (Q=1→Q̄=1), and the "f₂" signal causes to output the "B" signal, thereby setting the flip-flop 5 to assume the "B" state thereof (Q=1).

TABLE [I]

|  | RESET | f₁ | f₅ | f₃ | f₁ | f₂ | NUMBER of STATE CHANGES |
|---|---|---|---|---|---|---|---|
| NORMAL | A | D<br>↓<br>B | A | B | D<br>↓<br>A | B | 5 |
| NON-NORMAL 1 | A | D<br>↓<br>B | D<br>↓<br>A | B | D<br>↓<br>A | B | 5 |
| 2 | A | D<br>↓<br>B | D<br>↓<br>A | D<br>↓<br>B | D<br>↓<br>A | B<br>↓<br>B | 5 |
| 3 | A | D<br>↓<br>B | D<br>↓<br>A | D<br>↓<br>B | D<br>↓<br>A | D<br>↓<br>B | 5 |
| 4 | A | D<br>↓<br>B | A | D<br>↓<br>B | D<br>↓<br>A | B | 5 |
| 5 | A | D<br>↓<br>B | A | D<br>↓<br>B | D<br>↓<br>A | D<br>↓<br>B | 5 |
| 6 | A | D<br>↓<br>B | A | B | D<br>↓<br>A | D<br>↓<br>B | 5 |
| 7 | A | D<br>↓<br>B | D<br>↓<br>A | B | D<br>↓<br>A | B | 5 |

The number of state changes, five times as shown in the table [I], in the polarity flip-flop 5, that is, "A→B→A→B→A→B", is counted by a state change counter 23, and then the AND gate 24 goes to an enabling condition. Consequently, under this condition, the output of the AND gate 24 is applied to the validation field counter 25 when the "f₆" signal is detected again by the code detector 1, and the counter 25 is advanced by one. If the forementioned operation is successively repeated by the predetermined number of times, the validation field counter 25 applies its output signal to the retrigger monostable multivibrator 26 and the multivibrator thus generates the valid signal.

As explained above in detail, in the pay T.V. system, the fundamental principle of the function of validation (the output of the valid signal) is that, on the basis of the validation signal transmitted from the encoder in the transmitting end, the decoder of the receiving end must be able to validate that the key code therein is preset to normally correspond to that in the encoder. In other words, when the valid signal is output in the decoder, there must be one to one correspondence between the key code preset in the decoder and the key code preset in the encoder. Further, in the conventional system shown in FIGS. 1 and 2, the validation signal is checked only by the number of state changes of the polarity flip-flop 5, as described above.

However, as exemplified in the following explanation, the conventional system may generate the valid signal even if the key code preset in the decoder is non-normal to the key code preset in the encoder. This means that, although the encoded composite signal is decoded non-normally, the billing data may be recorded when the intention of watching is expressed. Such unjustness is fatal to the pay T.V. system.

Each of the cases of "NON-NORMAL 1" to "NON-NORMAL 7" in the key code column of the table [I] illustrates a case where an non-normal valid signal is output. The case of "NON-NORMAL 1", for example, will be explained as follows.

Even if the key code of the key code circuit 4 is so preset non-normally that the preset key code is different from the normal key code (f₁→D, f₂→B, f₃→B, f₅→A) with relation to FIG. 2 and the signals of "f₁", "f₂", "f₃" and "f₅" cause the circuit 4 to output the signals "D", "B", "B" and "D", respectively (f₁→D, f₂→B, f₃→B, f₅→D), the state change in the polarity flip-flop 5 occurs five times. Therefore, when such operation is successively repeated by the predetermined number of times, the valid signal may be generated to record the billing data. However, when a further sequence of code signals "f₅f₂f₁f₅f₁" differing from the sequence of code signals "f₁f₅f₃f₁f₂" as described above is received after recording the billing data, each of the signals "D(=B)", "B", "D(=A)", "D(=B)" and "D(=A)" is output in response to the non-normal key code (f₁→D, f₂→B, f₃→B, f₅→D) and the encoded composite T.V. signal, therefore, is decoded non-normally, despite that each of the signals "A", "B", "D(=A)", "A", "D(=B)" as the control inputs to the polarity flip-flop 5 is expected to be output in response to the normal key code (f₁→D, f₂→B, f₃→B, f₅→A). Thus, it is unjust that the billing data may be recorded in spite of the non-normal decoding of the signal.

The disadvantages as mentioned hereinabove are caused by the fact that the "D" signal output from the key code circuit 4 acts as a toggle signal for the polarity flip-flop 5 and, more particularly, by the fact that, for example, the state change from the "B" state (set state) to the "A" state (reset state) in the polarity flip-flop 5 upon receipt of the "A" signal is equivalent to the state change from the "B" state to the "A" state upon receipt of the "D" signal.

SUMMARY OF THE INVENTION

The present invention resides in avoiding the above-mentioned disadvantages. This is accomplished by the technical idea that the apparatus according to the present invention includes a feature detector means detecting from the outputs of the key code circuit a distinctive code state included in the validation signal (a sequence of code signals), or is so constructed that an undesirable signal path which is connected from the output of the key code circuit to the input of the polarity flip-flop is omitted.

It is, therefore, an object of the present invention to provide an improved validation apparatus in the pay television system.

Another object of the invention is to provide a highly reliable validation apparatus which makes it possible to output the decoded or normal composite T.V. signal only when the corresponding relation between one key code in the encoded composite T.V. signal and the other key code preset in the decoder is accurate.

These and other objects and advantages of the present invention will be appear more clearly from the following detailed disclosure read in conjunction with the accompanying drawings.

DESCRIPTION OF THE PREFERRED EMBODIMENTS

Figure 3:
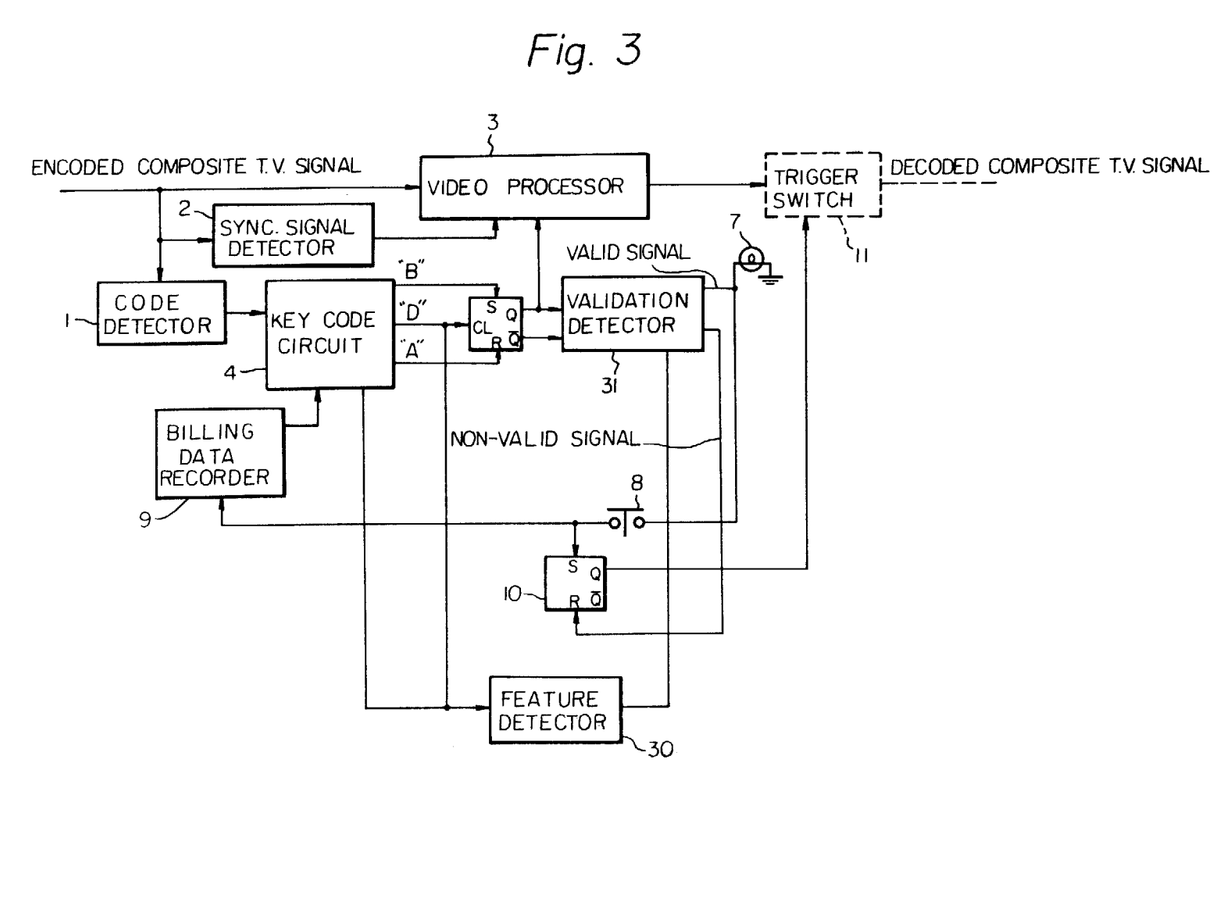
FIG. 3 is a block diagram showing one embodiment of the validation apparatus according to the present invention.
Figure 4:
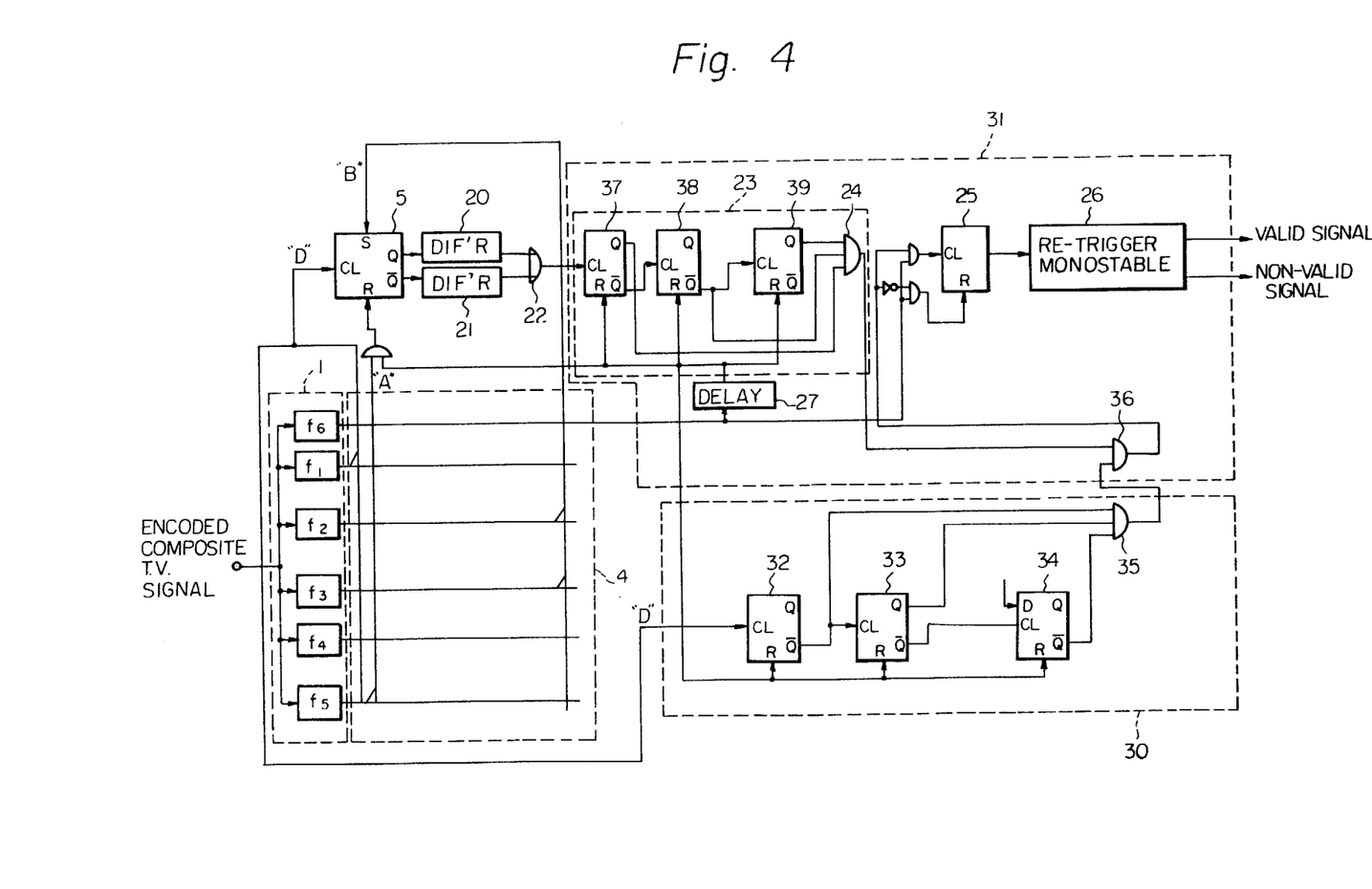
FIG. 4 is a detailed circuit diagram of a portion of the validation apparatus shown in FIG. 3.

FIG. 3 is a block diagram showing one embodiment of the validation apparatus which is provided in the receiving end of the pay T.V. system, and FIG. 4 is a detailed circuit diagram of a logic circuit of the validation apparatus shown in FIG. 3. For convenience' sake, the same reference numbers in FIGS. 1 and 2 are used to designate similar circuit elements in FIGS. 3 and 4.

The validation apparatus according to the present invention is characterized in that the apparatus includes a feature detector 30 for detecting from the output signals of the key code circuit 4 a distinctive code state included in the validation signal (a sequence of code signals), and a validation detector 31 for processing logically both the number of state changes in the polarity flip-flop 5 and the output signal of the feature detector 30 and generating a valid signal, thereby generating the valid signal when the number of state changes in the flip-flop 5 reaches a predetermined value and, at the same time, the feature detector 30 is satisfied with its output condition.

As compared with the prior art apparatus shown in FIGS. 1 and 2, the construction of the apparatus according to the present invention will be explained as follows.

As shown in FIG. 4, the feature detector 30 comprises a ternary counter including a first, a second and a third flip-flops 32, 33 and 34, respectively, and an AND gate 35. The "D" signal output is connected to the clock input CL of the first flip-flop 32. The $\bar{Q}$ output of the flip-flop 32 is connected to the first input of an AND gate 35 and to the clock input of the second flip-flop 33. The Q output of the flip-flop 33 is connected to the second input of the AND gate 35, and the $\bar{Q}$ output is connected to the clock input CL of the third flip-flop 34. The $\bar{Q}$ output of the flip-flop 34 is connected to the third input of the AND gate. On the other hand, the "$f_6$" signal output is connected to each of the reset inputs Rs of the first, second and third flip-flops 32, 33 and 34, respectively, through a delay circuit 27. The output of the AND gate 35, which is the output of the feature detector 30, is connected to the second input of the AND gate 36 in the validation detector 31, the first input of which is connected to the output of the AND gate 24 in the state change counter 23. The AND gate 36 makes it possible to advance the validation field counter 25 when the gate is enabled, thereby detecting the "$f_6$" signal.

Figure 5:
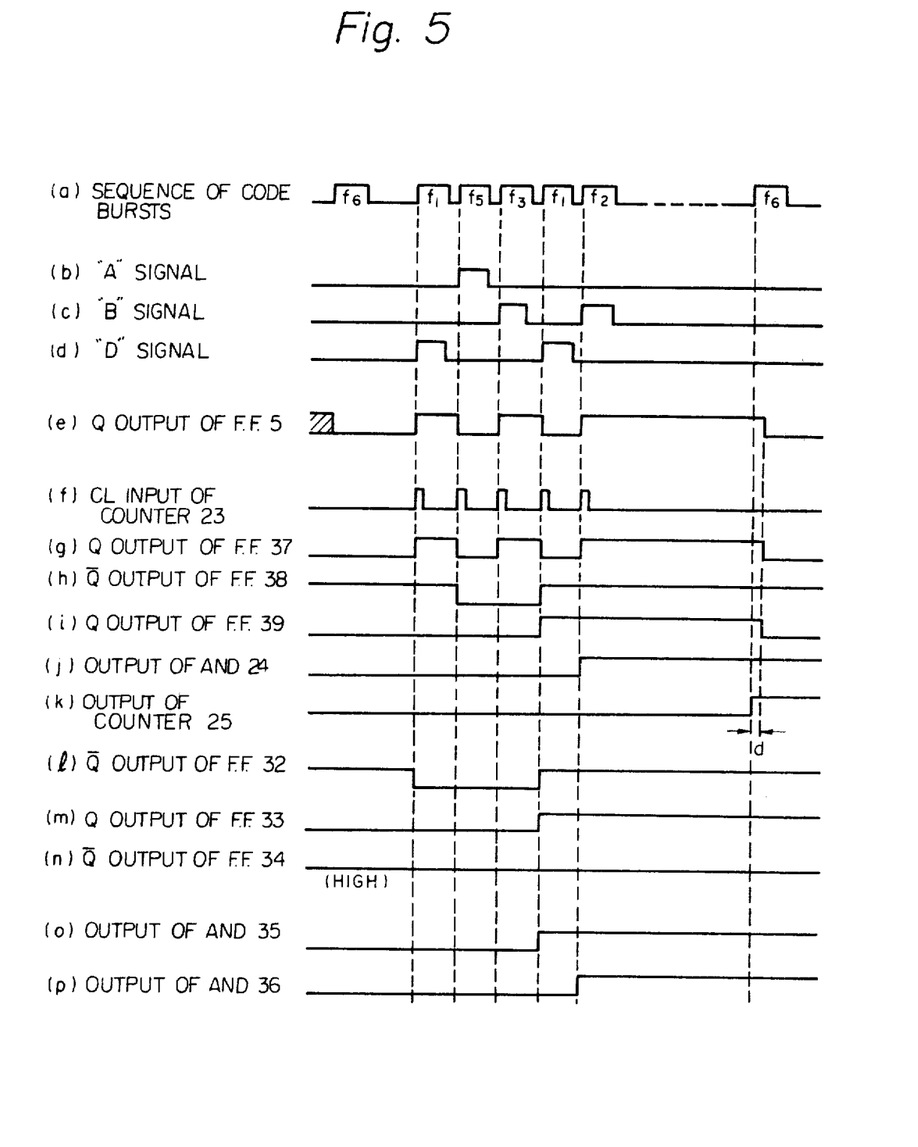
FIG. 5 is a signal wave-form diagram in relation to the circuit shown in FIG. 4.

Referring now to the signal wave-forms as shown in FIG. 5, the operation of the circuit shown in FIG. 4 will be explained as follows.

It is assumed that the key code of "$f_1 \rightarrow D$, $f_2 \rightarrow B$, $f_3 \rightarrow B$, $f_4 \rightarrow C$ and $f_5 \rightarrow C$" is preset in the key code circuit in the same manner as described above, and a sequence of the code signals is arranged as "$f_1 f_5 f_3 f_1 f_2$" (FIG. 5-(a)). Further, this assumption means that, in relation to the present apparatus, the key code of the encoder in the transmitting end is so preset that the "D" signal is generated twice by an identical code signal (e.g. "$f_1$") and is generated to be followed by the "B" signal or the "A" signal (see the normal key code column in the table [I]).

Under the previous assumption, if the code detector 1 detects the "$f_6$" signal, then the signal acts to count up the validation field counter 25 when the output of the AND gate 35 is in the logic "1", while the signal acts to reset the counter when the output is in the logic "0". Also, the "$f_6$" signal resets each of all three flip-flops 32, 33 and 34 in the feature detector 30 and, therefore, each of the $\bar{Q}$ outputs thereof is in the logic "1" ($\bar{Q}=1$) (FIG. 5-(l) and (n)). Then, the code detector 1 detects successively a sequence of the code signals "$f_1 f_5 f_3 f_1 f_2$" (FIG. 5-(a)) and, as shown in the normal key code column in the table [I], the first "$f_1$" signal causes the key code circuit 4 to output the "D" signal (FIG. 5-(d)). The "D" signal is applied to the clock input CL of the flip-flop 32 and, therefore, the $\bar{Q}$ output of the flip-flop goes to the logic "0" ($\bar{Q}=0$). Then, when the second or last "$f_1$" signal is detected, thereby generating the "D" signal again, all three inputs of the AND gate 35 are enabled' and the output thereof goes to the logic "1" (FIG. 5-(o)), since the $\bar{Q}$ output of the flip-flop 32 goes to the logic "1", the Q output of the flip-flop 33 also goes to the logic "1" and the $\bar{Q}$ output of the flip-flop 34 is sustained in the logic "1" (FIG. 5-(l), (m) and (n)).

With such operation, the output of the AND gate in the state change counter 23 is in the logic "1" (FIG. 5-(j)) because, as explained in relatiion to FIG. 2, the state change in the polarity flip-flop 5 occurs five times (FIG. 5-(e)) in response to detecting a sequence of the code signals "$f_1 f_5 f_3 f_1 f_2$". Accordingly, each of the first and second inputs of the AND gate 36 is enabled, and the resulting output thereof, that is, the logic "1" (FIG.

5-(p)) operates the validation field counter 25 and then the output of the counter causes the retrigger monostable multivibrator 26 to output the valid signal.

On the other hand, in spite of the non-normal key codes such as the "NON-NORMAL 1" through the "NON-NORMAL 7" shown in the key code column of the table [I], the state change counter 23 may count "5" and the AND gate 24 may output the logic "1". In such cases, it is apparent that the generation of the valid signal must be effectively prevented. It is common to the "NON-NORMAL 1" to the "NON-NORMAL 7" that the "D" signal is output from the key code circuit 4 three or more times. If the "D" signal is output in three or more times, not all of three inputs of the AND gate 35 are enabled. For example, when the third "D" signal is applied to the feature detector 30, in other words, when the detector receives the "D" signal if the Q output of the flip-flop 33 is in the logic "1", the $\bar{Q}$ output of the flip-flop 34 goes to the logic "0". Thus, although the output of the AND gate 24 in the state change counter 23 is in the logic "1", the output of the AND gate 36 goes to the logic "0" because the output of the AND gate 35 is in the logic "0", and then, at the timing of the next "$f_6$" signal, the resetting signal is applied to the validation field counter 25, thereby preventing the retrigger monostable multivibrator 26 from generating the valid signal.

As mentioned hereinabove, if the key code in the decoder is so preset that the "D" signal is generated in excessive times in response to the key code in the encoder, then the operation of the feature detector 30 prevents the retrigger monostable multivibrator 26 from generating the valid signal even if the number of state changes in the predetermined value, i.e., "5". This is accomplished also when the times of generating the "D" signal is a small number such that the "$f_1$" signal allows generation of the "A" signal or the "B" signal instead of the "D" signal, provided that the code signals other than the "$f_1$" signal do not allow generation of the "D" signal.

Consideration will now be given to the case where, in the normal key code "$f_1f_5f_3f_1f_2$", the identical code signal "$f_1$" causes the key code circuit 4 to generate not the "D" signal in two times but the "A" signal or the "B" signal and each of the other two code signals causes to generate the "D" signal. In such cases also, it is apparent that the generation of the valid signal must be prevented.

Firstly, it is assumed that, when the "$f_1$" signal allows generation of the "A" signal, as shown in the following table [II], the "PRESET 1" indicates that each of the "$f_5$" signal and the "$f_3$" signal allows generation of the "D" signal, the "PRESET 2" indicates that each of "$f_5$" and "$f_2$" allows generation of "D" and the "PRESET 3" indicates that each of "$f_3$" and "$f_2$" allows generation of "D".

TABLE [II]

|  |  | RESET | $f_1$ | $f_5$ | $f_3$ | $f_1$ | $f_2$ | NUMBER of STATE CHANGES |
|---|---|---|---|---|---|---|---|---|
| PRESET 1 | $f_5 \to D$ |  |  | A | D | D | A | B |  |
|  | $f_3 \to D$ | A | A | B | A | A | B | 3 |
| PRESET 2 | $f_5 \to D$ |  |  | A | D | B | A | D |  |
|  | $f_2 \to D$ | A | A | B | B | A | B | 3 |
| PRESET 3 | $f_3 \to D$ |  |  | A | A | D | A | D |  |
|  | $f_2 \to D$ | A | A | A | B | A | B | 3 |

In all of these cases, the feature detector 30 receives the "D" signal two times and outputs the logic "1". However, the number of state changes in the polarity flip-flop 5 is three and then the state change counter 23 counts merely "3" which is not the normal number of state changes, i.e., "5". Therefore, the output of the AND gate 24 goes to the logic "0" and, at the timing of the next "$f_6$" signal, the resetting signal is applied to the validation field counter 25.

Secondly, it is assumed that, when the "$f_1$" signal allows generation of the "B" signal, as shown in the following table [III], the "PRESET 1" indicates that each of "$f_5$" and "$f_3$" allows generation of "D", the "PRESET 2" indicates that each of "$f_5$" and "$f_2$" allows generation of "D" and the "PRESET 3" indicates that each of "$f_3$" and "$f_2$" allows generation of "D".

|  |  | RESET | $f_1$ | $f_5$ | $f_3$ | $f_1$ | $f_2$ | NUMBER of STATE CHANGES |
|---|---|---|---|---|---|---|---|---|
| PRESET 1 | $f_5 \to D$ |  |  | B | D | D | B | B |  |
|  | $f_3 \to D$ | A | B | A | B | B | B | 3 |
| PRESET 2 | $f_5 \to D$ |  |  | B | D | B | B | D |  |
|  | $f_2 \to D$ | A | B | A | B | B | A | 4 |
| PRESET 3 | $f_3 \to D$ |  |  | B | A | D | B | D |  |
|  | $f_2 \to D$ | A | B | A | B | B | A | 4 |

In all of these cases also, the feature detector 30 receives the "D" signal two times and outputs the logic "1". However, the number of state changes in the polarity flip-flop 5 is three or four and then the state change counter 23 counts merely "3" or "4". Therefore, the output of the AND gate 24 goes to the logic "0" and, at the timing of the next "$f_6$" signal, the resetting signal is applied to the validation field counter 25.

Figure 6:
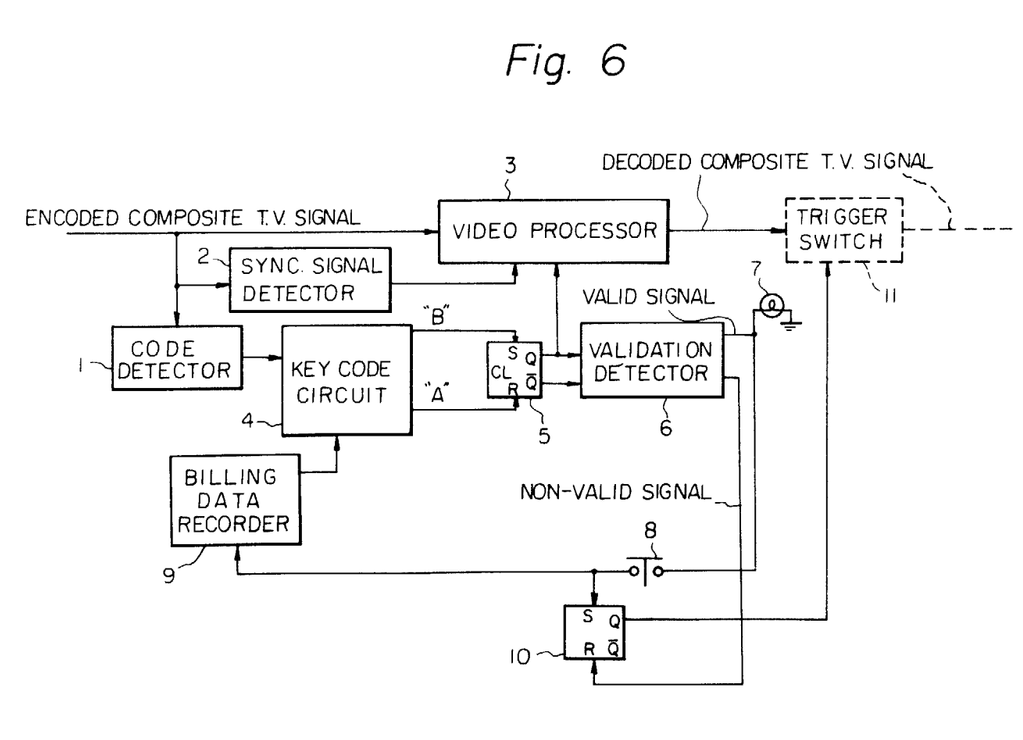
FIG. 6 is a block diagram showing another embodiment of the validation apparatus according to the present invention.
Figure 7:
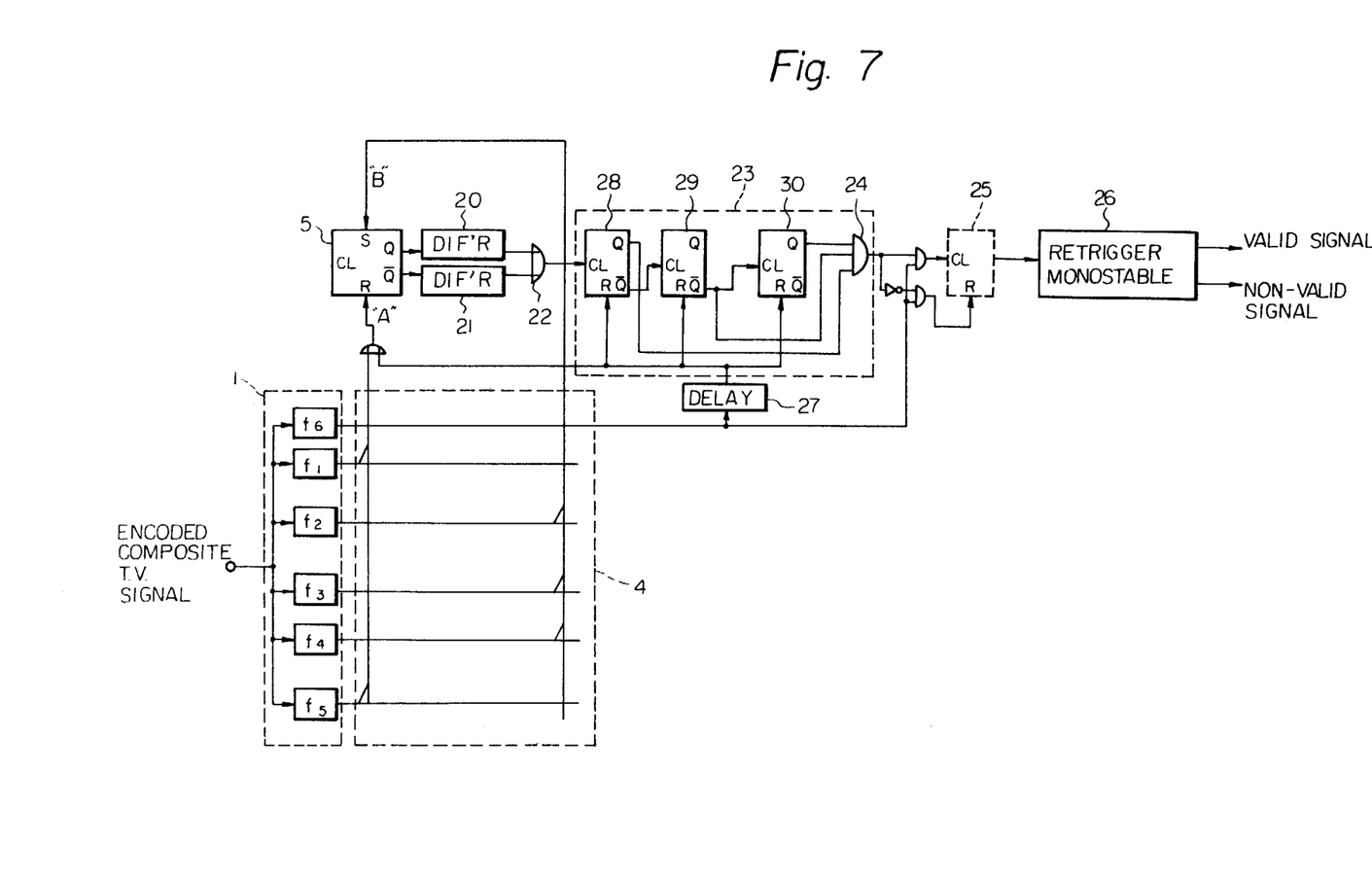
FIG. 7 is a detailed circuit diagram of a portion of the validation apparatus shown in FIG. 6.

FIG. 6 is a block diagram showing another embodiment of the validation apparatus which is provided in the receiving end of the pay T.V. system, and FIG. 7 is a detailed logic circuit of a portion of the validation apparatus shown in FIG. 6. For convenience' sake, the same reference number in FIGS. 1 and 2 are used to designate similar circuit elements in FIGS. 6 and 7.

As described hereinabove, the disadvantages of the prior art validation apparatus are due to the fact that the "D" signal output from the key code circuit 4 acts as a toggle signal for the polarity flip-flop 5. Consequently, the present apparatus is characterized by such construction that the state in the polarity flip-flop 5 changes only in the predetermined number of times without performing the operation caused by the "D" signal. More particularly, the "D" signal path which is connected from the output of the key code circuit 4 to the clock input CL of the polarity flip-flop 5 is omitted, and, further, the code signal (e.g., the "$f_1$" signal) which causes the key code circuit 4 to generate the "D" signal in the prior art apparatus is so preset that the "A" signal or the "B" signal (the "A" signal in the embodiment as shown in FIGS. 6 and 7) is generated by the code signal. Also, the key code circuit 4 is constructed to generate both the "A" signal and the "B" signal and, therefore, the validation signal assuming such construction must be added to the normal composite T.V. signal in the transmitting end.

Figure 8:
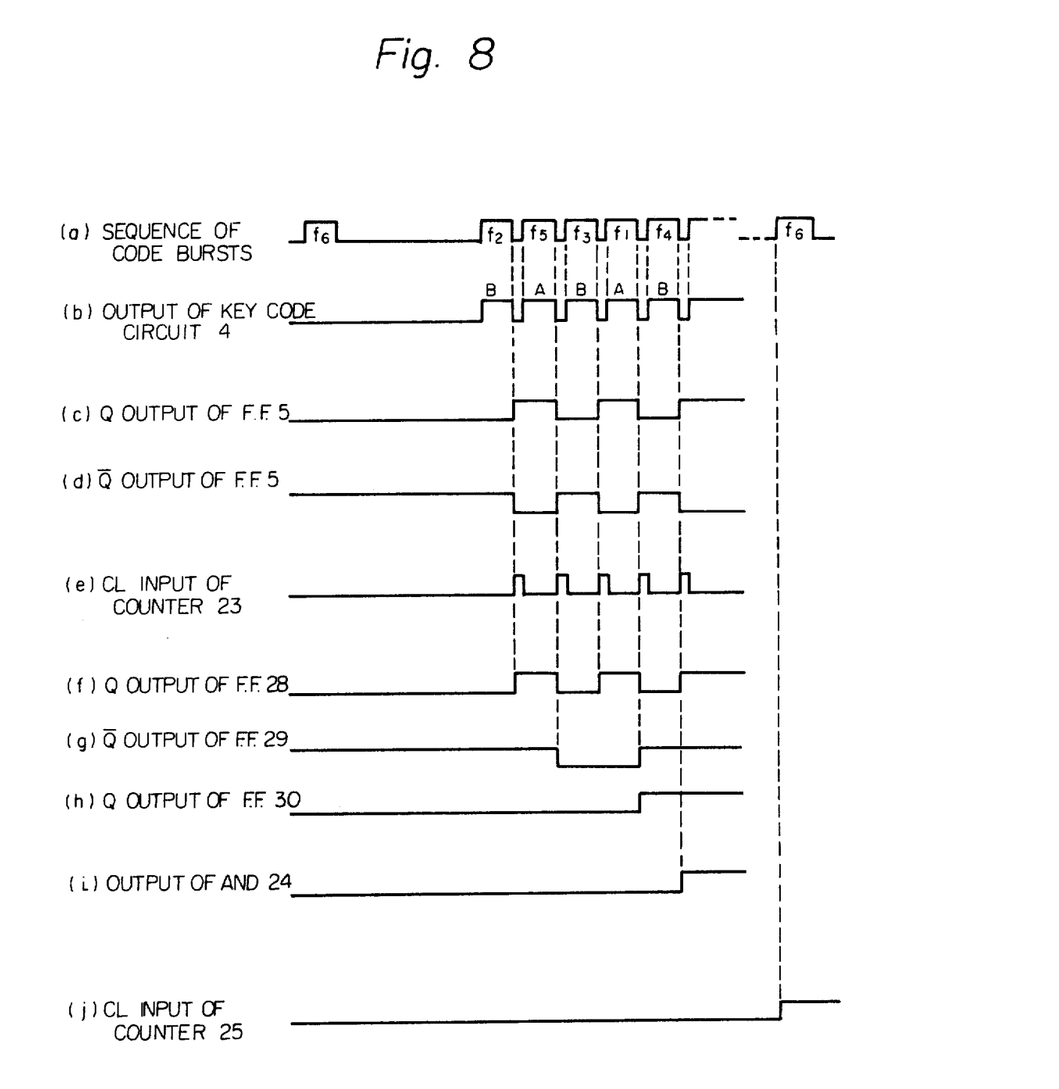
FIG. 8 is a signal wave-form diagram in relation to the circuit shown in FIG. 7.

Referring now to the signal wave-forms as shown in FIG. 8, the operation of the circuit as shown in FIG. 7 will be explained as follows.

It is assumed that, in the transmitting end, a normal sequence of code signals "$f_2f_5f_3f_1f_4$" (FIG. 8-(a)) is preset as a validation signal. Additionally, the key code circuit 4 is so preset that the circuit generates the "A" signal when the code detector 1 detects the "$f_1$" signal, generates "B" when detects "$f_2$", generates "B" when detects "$f_3$", generates "B" when detects "$f_4$" and generates "A" when detects "$f_5$" ($f_1 \rightarrow A$, $f_2 \rightarrow B$, $f_3 \rightarrow B$, $f_4 \rightarrow B$ and $f_5 \rightarrow A$) (FIG. 8-(b)).

If the "$f_6$" signal is firstly detected by the code detector 1, then the signal acts to cause the validation field counter 25 to add "one" when the output of the AND gate 24 is in the logic "1", while the signal acts to reset the counter 25 when the output is in the logic "0". At the same time, the "$f_6$" signal resets the polarity flip-flop 5 and brings it to an initial state ("A" state). Then, the code detector 1 detects, in succession, a sequence of the code signals "$f_2f_5f_3f_1f_4$" as described above. As shown in the following table [IV], in successive sequence, the "$f_2$" signal causes the key code circuit 4 to output the "B" signal, thereby setting the polarity flip-flop 5 and bringing the "B" state thereof (Q=1), the "$f_5$" signal causes to output the "A" signal, thereby resetting the flip-flop 5 and to assume the "A" state thereof ($\bar{Q}$=1), the "$f_3$" signal causes to output the "B" signal, thereby setting again the flip-flop 5 to assume the "B" state thereof (Q=1), the "$f_1$" signal causes to output the "A" signal, thereby resetting again the flip-flop 5 to assume the "A" state thereof ($\bar{Q}$=1), and the "$f_4$" signal causes to output the "B" signal, thereby setting the flip-flop 5 to assume the "B" state thereof (Q=1) (FIG. 8-(c) and (d)).

TABLE [IV]

| | RESET | $f_2$ | $f_5$ | $f_3$ | $f_1$ | $f_4$ | NUMBER of STATE CHANGES |
|---|---|---|---|---|---|---|---|
| STATE | A | B | A | B | A | B | 5 |

The number of state changes, five as shown in the table [IV], in the polarity flip-flop 5, that is, "A→B→A→B→A→B", is counted by the state change counter 23 (FIG. 8-(e)), and then the AND gate 24 goes to the enabling condition as described in relation to FIG. 2. Consequently, under this condition, the output of the AND gate 24 (FIG. 8-(i)) is applied to the validation field counter 25 when the "$f_6$" signal is detected again by the code detector 1, and the counter 25 is advanced by one. If the forementioned operation is successively repeated by the predetermined number of times, the validation field counter 25 applies its output signal (FIG. 8-(j)) to the retrigger monostable multivibrator 26 and the multivibrator thus generates the valid signal.

On the other hand, if the preset of the key code circuit 4 is in the non-normal state as shown in the following table [V], the generation of the valid signal will be effectively prevented.

TABLE [V]

| | RE-SET | $f_2$ | $f_5$ | $f_3$ | $f_1$ | $f_4$ | NUMBER of STATE CHANGES |
|---|---|---|---|---|---|---|---|
| PRESET 1 ($f_1 \rightarrow B$) | A | B | A | B | B | B | 3 |
| | | | | | X | | |
| PRESET 2 ($f_3 \rightarrow A$) | A | B | A | A | A | B | 3 |
| | | | | X | | | |
| ($f_1 \rightarrow B$) | A | B | B | B | B | A | 2 |
| PRESET 3 ($f_5 \rightarrow B$) | | | X | | | | |
| ($f_4 \rightarrow A$) | | | | | X | X | |

Incidentally, it is assumed that, in the cases of the table [V], the "PRESET 1" indicates that the "$f_1$" signal allows generation of the "B" signal, the "PRESET 2" indicates that the "$f_3$" signal allows generation of the "A" signal, and the "PRESET 3" indicates that each of the "$f_1$" signal and the "$f_5$" signal allows generation of the "A" signal and the "$f_4$" signal allows generation of the "A" signal. In all of these cases, the number of state changes in the polarity flip-flop 5 is less than the normal times, i.e., "5", and the resulting count of the state change counter 23 does not reach the predetermined value. Therefore, the output of the AND gate 24 is in the logic "1", and, at the timing of the next "$f_6$" signal, the resetting signal is applied to the validation field counter 25, and thus the generation of the valid signal is effectively prevented.

What is claimed is:

1. A validation apparatus in a pay television system for receiving an encoded composite T.V. signal which has been formed by adding a sequence of code signals as a first key code to a normal composite T.V. signal in a transmitting end, and validating the accurate corresponding relation between said first key code and a second key code which is preset in a receiving end, said apparatus comprising:

a code detector means for successively detecting from said encoded composite T.V. signal said sequence of code signals;

a key code circuit means having said second key code so as to validate said sequence of code signals detected by said code detector means for generating a first, a second and a third control signals in response to said sequence of code signals;

a polarity flip-flop means being set by said first control signal, thereby assuming a first state thereof being reset by said second control signal, thereby assuming a second state thereof, and being toggled by said third control signal, thereby changing from the first state to the second state or changing from the second state to the first state;

a counter means for generating an output signal when the number of state changes in said flip-flop means reaches a predetermined value;

a feature detector means for generating an output signal when the detector means receives said third control signal a predetermined number of times which is peculiar to said sequence of code signals; and a gating means for generating an output signal so as to generate a valid signal representing that said encoded composite T.V. signal is effectively decoded when both the output signal of said counter means and the output signal of the feature detector means are input thereto at the same time.

2. The validation apparatus as set forth in claim 1, wherein said feature detector means comprises a ternary counter including a first, a second and a third flip-flops, and an AND gate.

* * * * *